United States Patent
Justesen et al.

[11] Patent Number: 5,902,663
[45] Date of Patent: May 11, 1999

[54] LOW-STRETCH AND DIMENSION STABLE FLOOR COVERING

[75] Inventors: Knud Erik Justesen, Alborg SØ; Lars Valbæk Jessen, Silkeborg; Jørgen Bech Madsen, Ålborg, all of Denmark; Mogens Ovesen Nygaard, Ede, Netherlands

[73] Assignee: Fibertex A/S, Denmark

[21] Appl. No.: 08/962,572

[22] Filed: Nov. 3, 1997

Related U.S. Application Data

[63] Continuation of application No. 08/552,927, Nov. 3, 1995, abandoned, which is a continuation-in-part of application No. 08/166,379, Dec. 14, 1993, abandoned.

[30] Foreign Application Priority Data

Sep. 1, 1993 [NL] Netherlands ............................ 9301511
Nov. 2, 1993 [DK] Denmark ................................. 1235/93

[51] Int. Cl.⁶ ........................................................ B32B 3/02
[52] U.S. Cl. ............................ 428/95; 428/96; 442/364; 442/403; 442/411; 442/414
[58] Field of Search ........................ 428/95, 96; 442/364, 442/403, 411, 414

[56] References Cited

U.S. PATENT DOCUMENTS

| | | | |
|---|---|---|---|
| 3,576,687 | 4/1971 | Parlin . | |
| 3,661,691 | 5/1972 | Slosberg | 428/95 |
| 3,922,454 | 11/1975 | Roecker | 428/95 |
| 4,009,310 | 2/1977 | Scobbo | 428/97 |
| 4,131,704 | 12/1978 | Erickson et al. | 428/95 |
| 4,151,023 | 4/1979 | Platt et al. | 156/62.2 |
| 4,172,166 | 10/1979 | Hartmann et al. | 428/95 |
| 4,342,813 | 8/1982 | Erickson | 428/296 |
| 4,412,877 | 11/1983 | Vosburgh | 428/95 |
| 4,439,476 | 3/1984 | Guild | 428/97 |
| 4,673,604 | 6/1987 | Frain, III et al. | 428/95 |
| 4,702,950 | 10/1987 | Slosberg et al. | 428/95 |
| 5,030,497 | 7/1991 | Claessen | 428/95 |
| 5,077,874 | 1/1992 | Trask et al. | 428/95 |
| 5,118,550 | 6/1992 | Baravian et al. | 428/95 |
| 5,182,162 | 1/1993 | Andrusko | 428/95 |
| 5,283,097 | 2/1994 | Gillyns et al. | 428/97 |
| 5,472,763 | 12/1995 | Schwarz et al. | 428/97 |
| 5,532,035 | 7/1996 | Corbin et al. | 428/296 |

FOREIGN PATENT DOCUMENTS

| | | |
|---|---|---|
| 0 005 050 A2 | 10/1979 | European Pat. Off. . |
| 0 547 533 | 6/1993 | European Pat. Off. . |
| 0 590 422 A1 | 4/1994 | European Pat. Off. . |
| 1635480 | 11/1967 | Germany . |
| 3340839 C2 | 11/1983 | Germany . |
| 2 151 545 | 7/1985 | United Kingdom . |
| WO94/00043 | 1/1994 | WIPO . |

*Primary Examiner*—Terrel Morris
*Attorney, Agent, or Firm*—Finnegan, Henderson, Farabow, Garrett & Dunner, L.L.P.

[57] ABSTRACT

A low-stretch and dimensionally stable floor covering (1) comprising polymer-containing pile material (2) which is retained to a polymer-containing primary backing (3), to the back of which an underlying secondary backing layer (5) is retained by means of an interleafing adhesive layer (4). The secondary backing layer (5) comprises a needled fibre structure of thermoplastic, polymer-containing, continuous or staple fibres being inter-fixated by heating. The adhesive layer (4) comprises an organic, polymer-containing binder which is activated by heat application. According to the invention, at least the secondary backing layer and/or the binder layer comprise a substantially re-usable material. After being formed, the carpet is wound onto so-called broadloom rollers and can, if desired, be cut partially into carpet tiles. Thus, carpet tiles and broadloom carpets can be manufactured in the same production process.

38 Claims, 11 Drawing Sheets

FIG. 6

BI-COMPONENT (POLYPROPYLENE / POLYETHYLENE FIBRE)
RATE: 10.0 °C/min 11.800 mg INTEGRATION
DELTA H  1333 mJ
         112.9 J/g
PEAK     130.2 °C
         -1.0 W/g

POLYPROYLENE

POLYETHYLENE

∧ exo

POLYPROPYLENE FIBRE

OXYGEN

RATE : 10.0 °C/min

INTEGRATION
DELTA H   671 mJ
              65.8 J/g
PEAK      167.1 °C
              -6.0 mW
CONTENT 34.6 %
REF. dH   190.0 J/g

ONSET 213.1 °C
SLOPE 6.79 mW/K 20 mW

°C

LOW-STRETCH AND DIMENSION STABLE FLOOR COVERING

CROSS-REFERENCE TO RELATED APPLICATIONS

This application is a continuation of application Ser. No. 08/552,927, filed Nov. 3, 1995 now abandoned which is a continuation-in-part of application Ser. No. 08/166,379, filed Dec. 14, 1993 now abandoned.

BACKGROUND OF THE INVENTION

The present invention concerns a low-stretch floor covering material applicable both as wall to wall (broadloom) carpets and as carpet tiles, said material exhibiting both a dimensional stability under climatic changes in accordance with the specifications for carpet tiles, especially for contract carpeting and the ability to be wound onto broadloom rollers. The invention further concerns a method of manufacturing a floor covering of the kind stated in the introduction and in which in an initial production step a web-formed semi-manufactured material is produced which comprises pile material being retained to a primary backing layer.

Low-stretch and dimensionally stable floor coverings include wall-to-wall (also often called broadloom) carpets and carpet tiles exhibiting a low degree of shrinkage and/or expansion lengthwise and/or widthwise, and consequently being highly capable of resisting varying moisture and heat impacts in use. Especially within the field of contract applications the dimensional stability of carpet tiles is to-day—due to their construction—considerably higher than that of broadloom carpets. To compensate for the lower dimensional stability of broadloom carpets they are for contract applications to-day glued down to sub-floors by means of a permanent glue. Carpet tiles are only installed and glued down by means of tackifier or are simply meant to be held in place by their high weight.

The known low-stretch and dimensionally stable floor coverings when used as wall-to-wall carpets comprise a semi-manufactured material with pile material which is retained to a primary backing layer having a secondary backing layer which e.g. may consist of a coating of natural rubber, chalk-filled (calciumcarbonate-filled) SBR-latex foam or polyurethane foam or the like. These backing layers are normally applied in a thickness of 2–8 mm. Because of their elastomeric properties foamed backing layers contribute significantly to the walking comfort. Additionally, the foamed backing layers also provide good temperature and sound insulation.

These known foamed backing layers, however, entail significant adverse environmental impacts, which are undesired in particular in the light of the present strict demands on environmentally friendly and re-usable products. By re-usable products are meant products containing components which can be melted down and again enter into a production process, or components which by incineration give approximately nul residual ash percentage. The foamed backing layers often give off residual gases for prolonged periods after production entailing risk of nuisance to the indoor climate in the room where the carpet has been laid out. At the same time it is a problem that the foamed backing layers after use for some length of time of the floor covering stick so well to the underlying floor that the foamed backing layer often in very large areas is separated from the floor covering when worn-out floor covering is to be removed. The large areas with attaching remains of foamed backing layers must then be removed in a time-consuming working operation before a new floor covering can be laid on the floor.

The most significant disadvantage of the known floor coverings with foamed backing layer, however, consists in the limited possibilities of disposing of the used carpet coverings and the related unfortunate environmental impacts. In case of e.g. foamed chalk-filled SBR-latex backing coatings on worn out wall-to-wall carpets it is in practice at disposal only possible to achieve the level "incineration without energy recovery". Chalk-filled foam backing layer contain a high concentration of inorganic materials which are left as ash after incineration.

The generally known carpet tiles are widely used in particular as so-called project carpeting, that is, carpet especially for contract areas and for industrial use. Understood herein by carpet tile is a regularly formed piece of carpet which (measured according to specifications formulated for this purpose by national inspection agencies such as for instance TNO) has a shape and dimension stability under climatic changes sufficient to form a continuous floor covering under all conditions. A representative standard used in many countries at the time the present invention was made is DIN 66095 Teil 2 according to which the extension under specified climatic changes must not exceed +0.2%, and the shrinkage must not exceed −0.4%. Test methods for extension and shrinkage are e.g. ISO 2551 and DIN 54318.

In such applications carpet tiles have great advantages compared with conventional broadloom carpets. The tiles are for instance easy to take up, whereby easy access can be obtained to the space under the floor for (re)positioning for instance computer and electricity cables. Carpet tiles can also be easily laid without unnecessary disruption of the normal activities in a room area. In addition, carpet tiles can be replaced locally in simple manner, which is advantageous when particular parts of a room area are used more intensively than others. They are also compact and therefore simple to transport, particularly in high-rise office buildings where rolls of carpet can cause great transport problems.

The known carpet tiles are usually provided with a relatively heavy secondary backing layer and binder layer in order to ensure their shape and dimension stability. The secondary backing layer is generally made of a strong coating of glass-reinforced bitumen or glass-reinforced PVC coating. The specific weight of a conventional carpet tile therefore amounts to roughly 5 kilograms per square meter.

A representative example of such carpet tiles is described in EP 0278690 A2. In order to provide a carpet tile with good dimensional stability, good lay flat characteristics, and which may be produced by an in-line production method, a carpet tile is suggested, which comprises a fibrous face wear surface secured to a primary backing sheet, a first precoat layer on the primary backing surface and comprising a hotmelt bitumen or petroleum resin composition, a second precoat layer secured to the first coating layer and which second coating layer comprises a bitumen hotmelt composition, a third coat backing layer which comprises a bitumen hotmelt composition, and a secondary backing sheet material to provide dimensional stability to the carpet and secured to the third coating backing layer. Dimensional stability is achieved by the secondary backing comprising a woven or non-woven glass fibre scrim and by the high total weight of the tile.

In order to further improve the dimensional stability EP 0420661 A2 describes a carpet tile comprising a wear surface and a primary backing comprising a solid, hotmelt composition and a secondary backing composed of adjacent layers of a porous, glass fibre sheet material e.g. tissue, non-woven glass fibre and a porous, fibrous sheet material with a fibrous sheet material as the exterior surface of the secondary backing layer, and wherein the hotmelt composition has penetrated and saturated the glass fibre material but has only partially penetrated the fibrous sheet material sufficiently to bond the fibrous sheet material. Typically, the carpet tile comprises a fibrous carpet material wherein the primary backing is a bitumen or a bitumen modified hotmelt composition. The secondary backing comprises separate, adjacent layers of a porous, lightweight glass fibre tissue sheet material which in itself gives the carpet tile the improved dimensional stability. However, in EP 0420661 polypropylene, non-woven sheet material is characterized as not in itself being a satisfactory material as a secondary backing carrier sheet.

EP 0590189 A1 was filed on Dec. 30, 1992 and published on Apr. 6, 1994 (Art.54(3)EPC) for DE, FR, GB, and NL. It confirms the disadvantages of prior art carpet tiles comprising bitumen/asphalt backing members or PVC-backings.

According to one embodiment of this invention a tile-shaped carpet is provided which comprises a backing member and an upper layer formed on the backing member, both of which are made of a propylene resin. Preferably the upper layer includes a base fabric sublayer and a pile sublayer, both of which are made of propylene resin.

While reference is made to polypropylene fibres as part of the upper layer, the backing member is only described as being made of either propylene, monopolymer or copolymers of propylene and ethylene butene-1 and the like, which may comprise a regenerated product of the propylene resin. It is preferred to use an amorphous alpha-olefincoplymer and in fact the only embodiment specifically described is extrusion-moulded back-up members. The document comprises no reference to needled and textiled back-up members.

The known carpet tiles have a large number of drawbacks, however. The disposal and processing of the tiles at the end of their useful life thus causes great problems due to the nature and quantity of the materials used. When they are burned a significant portion, up to about 60% by weight, of the bitumen-containing tiles is left over in the form of ash.

Incineration of products such as tiles with PVC backing layers demands high energy supply during incineration, because PVC contains chlorine which uses energy during incineration instead of generating energy. Chlorine is also a toxic and etching gas which easily reacts with other inorganic and organic substances, wherefore incineration of floor coverings with PVC backing layer calls for special environmental measures during the incineration process.

It is moreover expected that the problems associated with the processing of waste tiles will become more pressing in the future since, with regard to the large numbers of carpet tiles laid and replaced annually (in Europe more than 40 million square meters with a weight of about 200,000 tons), legal requirements relating to the environmentally friendly processing thereof can be anticipated in the short term.

In addition, due to their comparatively heavy weight the known carpet tiles can only be simultaneously transported and laid in relatively small quantities. Moreover there is a considerable danger of back disorders for the carpet installers.

As previously mentioned the construction of carpet tiles and broadloom carpets is totally different. Therefore, carpet tiles and broadloom carpet have conventionally been produced by different processes and on different types of manufacturing equipment. This has been due to the mentioned different materials which the carpet industry has had to use until now for meeting the application requirements for these two different products. For manufacturing carpet tiles the relatively stiff, heavy weight backing of bitumen or PVC with glass have been used, or for broadloom carpets the backing has conventionally been relatively flexible, been consisting of calcium carbonate filled foam or equivalent materials. So far it was therefore not possible to integrate the manufacture of these two types of carpets in one and the same process.

From EP 0547533 A1 a stretchable floor covering is known which when being laid out are often stretched by many percent lengthwise and widthwise, whereafter the edges of the stretchable floor covering are secured to adjoining panels by means of nail lists or the like. The secondary backing layer is instead of the previously known foamed coatings constituted by a backing layer with a fibre structure being embedded in or encompassed by a textile bonding so as to impart acceptable strength properties to the secondary backing layer for use as a stretchable floor covering. By the textile bonding is meant that the fibre structure may e.g. be needlepunched to an underlying strength imparting web, or that the fibre structure is provided with stitches or loops in the longitudinal and cross-sectional directions, e.g. according to the known Maliwatt or Kettenwirk principles. The specification, however, provides no directions for a backing layer with a fibre structure being sufficiently dimensionally stable in the longitudinal and cross-sectional directions for enabling production of a low-stretch and dimensionally stable floor covering possessing the same strength and dimensional stability properties and walking comfort as the known floor coverings with foamed backing layers and the same dimensional stability as the known carpet tiles.

SUMMARY OF THE INVENTION

Consequently, it is the object of the present invention to provide a low-stretch and dimensionally stable floor covering possessing the same strength and dimensional stability properties and walking comfort as the known floor coverings, such as broadloom carpets having the undesired foamed backing layers and carpet tiles having glass scrim reinforced PVC- or bitumen-containing backing layers, and at the same time making it possible to avoid the undesired environmental impacts when disposing of the used floor coverings. The new floor covering should be applicable both as wall-to-wall carpets and as carpet tiles to be used optionally within the same fields, such as the contract areas, without the previously mentioned drawbacks for neither the wall-to-wall carpets nor the carpet tiles.

The low-stretch and dimensionally stable floor covering according to the present invention is characterized in that the backing layer comprises a needled fibre structure of essentially non-moisture absorbing thermoplastic, polymer-containing continuous fibres or staple fibres being inter-fixated by heating to a temperature which at least corresponds to the lowest softening temperature for the fibre materials in the fibre structure, and that the adhesive layer comprises an organic, polymer-containing binder which can be activated by heat application and has a reaction temperature which is lower than the melting temperature for the majority of the fibre material content in the fibre structure, and wherein the secondary backing layer has a specific weight of 70–1000 $g/m^2$ and the secondary backing layer and the adhesive layer together preferably have a specific weight of a maximum of 1.800 $g/m^2$.

The method of producing the low-stretch and dimensionally stable floor covering according to the invention comprises the steps of initially producing a web-formed semi-manufactured material comprising a pile material retained to a primary backing layer, heating a web-formed secondary backing layer having a specific weight of 70–1000 g/m² and comprising a needled fibre structure of essentially non-moisture absorbing thermoplastic, polymer-containing, continuous or staple fibres to a temperature at least corresponding to the lowest softening temperature for the fibre materials in the fibre structure so as to provide an interfixation of the fibres, joining the back side of the web-formed semi-manufactured material with the web-formed backing layer by interleafing an adhesive layer preferably in an amount, so that the specific weight of the secondary backing and the adhesive does not exceed 1800 g/m², said adhesive layer comprising an organic polymer-containing binder having a reaction temperature which is lower than the melting temperature for the majority of the fibre material content in the fibre structure and activating the binder by heat application, cooling the formed floor covering material so as to provide an essentially non-moisture absorbing bonded adhesive layer, winding the material onto broadloom rollers and optionally cutting the material wholly or partially into carpet tiles.

Hereby is achieved that it is possible to produce a low-stretch and dimensionally stable floor covering having a secondary backing layer of a needled fibre structure and having the same strength and stability properties both length-wise, widthwise, and cross-sectionally as well as walking comfort as the known floor coverings with the traditional undesired backing layers whether we are talking about wall-to-wall carpets or carpet tiles. The invention completely eliminates the environmental impacts at disposal as compared to the said known floor coverings. This applies for both wall-to-wall carpets and carpet tiles as these two floor covering products according to the invention are now identical.

By the invention it is surprisingly possible on the same equipment to produce a floor covering which optionally can be used as wall-to-wall carpets or as carpet tiles.

In view of the substantial thickness and the constitution of the tiles described in EP 0278690 A2, EP 0420661 A2, and EP 0590189 A1, it was highly surprising that a satisfactory floor covering which is suitable both as broadloom and as carpet tiles could be obtained by leaving out the numerous layers of bitumen, glass fibres etc.

In addition to the environmental advantages and a reduced consumption of materials etc. this invention is of great commercial value to the broadloom manufacturers who were not previously in a position to manufacture carpet tiles. This invention can be applied using existing equipment and, for a relatively low investment offers the broadloom manufacturer the opportunity to enter the market for carpet tiles.

The secondary backing layer is made in that a needled fibre web of either continuous fibres or staple fibres of an essentially non-moisture absorbing thermoplastic polymer material is heated to the softening temperature of the fibres, whereby they are adhered together to form a backing layer having a three-dimensional mechanically cross-bonded fibre structure where the fibres are inter-fixated. The fibres, which are three-dimensionally oriented will during force impact and slackening (walking effect) counteract the tension and somewhat return to their original fibre structure. This property is called re-raising capacity (resilience). In the fibre structure according to the invention the individual fibres are connected and fixated to each other to form the three-dimensional fibre structure, which is to be seen in contrast to a fibre structure where the fibres are only retained to each other mechanically and may consequently slip away from each other during force impact so that the stability is significantly reduced and the re-raising capacity will quickly be lost. By inter-fixating the three-dimensional fibre structure stability and comfort in the secondary backing is increased.

Heat application to the fibre structure may be performed by calendering the fibre structure either on one side or on both sides or may be performed by blowing hot air through the fibre structure, or a combination of the said two thermal treatment processes. The heat application may also be performed by IR-radiation, i.e. treatment with infra-red rays or similar methods.

The fibre structure may both comprise continuous or staple fibres having a length of 20–200 mm and fibre thicknesses from 1.5 dtex to 50 dtex. Most often the choice will be staple fibres in the interval 40–110 mm fibre length and 3.3–20 dtex fibre thickness. The weight of the fibre structure of the secondary backing layer will essentially lie between 70 g/m² and 1000 g/m², in particular between 100 g/m² and 600 g/m², preferably between 300 g/m² and 600 g/m². The heaviest backing layers are used for carpet for applications calling for particularly high walking comfort.

The fibre structure may be composed of fibre types which are used either 100% pure or in mixtures—and with varying thicknesses and lengths. Thus the fibre structure may consist of a mixture of synthetic fibres, such as polymers and copolymers based on polyamide, polyester, polyolefines (polypropylene and polyethylene) or polyacrylates. Applicable copolyesters may e.g. be based on terephthalic acid and various polyglycols and/or other aromatic carboxylic acids and alcohols. Applicable copolyamides may comprise 2, 3 or 4 different polyamides, e.g. polyamide 6, polyamide 6,6 and polyamide 12. The presently preferred thermoplastic polymer is polypropylene.

Thus fine results are obtainable as regards both walking comfort and re-raising capacity of the secondary backing layer when the fibre structure has a fibre content of 100% identical thermoplastics or a fibre content of mixtures of thermoplastics within the same group of polymers or different groups of polymers, but with different softening temperatures. A fibre content of a polymer with a lower softening temperature can thus be utilized to increase the thermal bond to the remaining fibre content.

The fibres with the lowest softening temperatures and melting points will act as binders during heat application, while the fibres with the higher softening temperatures remain intact. The softening temperature differences between the various fibre types must normally be at least 10° C. for the said property to be utilized.

According to the invention the fibre structure may comprise fibres which are produced from a combination of two different fibre material types, the core of the individual fibres being constituted by one fibre material type, and the surface being constitued by a modified or other fibre material type.

The adhesive layer in the floor covering material according to the invention has two main functions, viz. to attach the pile material to the primary backing and to attach the secondary backing to the semi-manufactured material formed by the pile and primary backing.

According to the invention a single adhesive layer can be used which serves both the above functions, or more binder layers can be used, where first the pile material is attached to the primary backing by means of a so-called precoat layer and subsequently a binder layer is used for attaching the secondary backing layer to the semi-manufactured material.

The adhesive layer (precoat and binder) which according to the invention comprises an organic polymer binder which can be activated by heat application so as to form an essentially non-moisture absorbing binder layer after bonding thereof can be applied in liquid state as an aqueous emulsion of liquid polymers and/or as a dispersion of polymer particles in an aqueous phase which may contain emulgated and/or dissolved polymer materials. Alternatively, the adhesive layer may be a thermoplastic binder applied in solid or melted form, also known as powder or hot melt adhesives or combinations thereof.

Whatever adhesive type is used the adhesive layer preferably contains at least one thermoplastic component.

The adhesive layer is distinguished from the adhesive layers used in traditional prior art broadloom carpets or carpet tiles in that it does not contain inorganic fillers e.g. calcium carbonate or clay nor does it necessitate the use of glass-scrims or the like.

The individual adhesive types can be further characterised as follows. For the sake of convenience the term "dispersion binders" is used as a general denomination for the above-mentioned binders applied in liquid state.

The dispersion binders may comprise a chemically reactive component, e.g. a latex, and/or a thermoplastic component, e.g. polyethylene, or may be in the form of a tenside wherein thermoplastic particles are dispersed.

The chemically reactive component forms a strong chemical bond by heat activation, and may comprise polymers and/or copolymers of e.g. polystyrene butadiene, polyacrylates, polystyrene acrylates and nitrile butadiene.

The thermoplastic component forms a coherent water-repellent structure after having been heat activated, said structure also improving the bonding effect to the primary and secondary backing. It may comprise very fine particles of polymers and/or copolymers of polyolefines, e.g. polyethylene, polyesters, polyamides or styrene-butadiene-styrene (SBS) blockcopolymers.

The types of dispersion binders which do not comprise a chemically reactive component, but mainly consist of tensides with dispersed thermoplastic particles, are also denominated paste binders.

Currently preferred dispersion binders are SBR-latex and polystyrene acrylic latex in which very fine polyethylene particles have been dispersed. These compositions provide good balance between high tuft lock and pile retention, moisture-repellency, and bonding between the semi-manufactured material and the secondary backing. The ratio between polyethylene and e.g. polystyrene acrylic latex is variable and adjustable according to the critical technical conditions of use relating to individual carpet constructions. Increasing polyethylene content provides stronger water-repellency, and makes the carpet stiffer.

The advantages of dispersion binders are that they, as mentioned, penetrate completely into the carpet fibres and provide very strong fibre anchoring as well as tuft lock. Further, they can be used on existing broadloom carpet lamination equipment.

Purely thermoplastic binder systems applicable according to the invention are "powder bonding" and "hot-melt" systems. The applicable thermoplastic binders comprise polymers and/or copolymers of polyolefines, polyester, polyamides or styrene-butadiene-styrene (SBS) block copolymers.

Powder bonding

According to this technique the thermoplastic is used in powder form. The powder is heated to its melting point, whereafter the overlying and underlying layers are pressed against the binder. This technique may involve problems of obtaining sufficient anchoring of the carpet fibres, for which reason, in practice, powder bonding is often used in combination with a dispersion binder. The principle is that initially a precoat layer of dispersion binder is applied in order to accomplish strong fibre anchoring. Thereafter the thermoplastic is applied in powder form to effect adhesion of the secondary backing to the semi-manufactured material.

The powder binder most frequently used is based on polyethylene. The advantages of using powder bonding are that by working on the basis of solid matter, and by using a purely thermoplastic binder, it is possible to reduce the binder quantity in comparison with dispersion binders, and at the same time reduce energy consumption and consequently production costs, since there is no water to be evaporated.

Hot-melt

According to the hot-melt systems the thermoplastic is used in molten, liquid form, the thermoplastic being extruded between the to layers to be adhered together.

Hot-melt, just like the powder bonding systems, is usable in combination with the precoats comprising dispersion binders.

According to the invention it is possible by the thermoplastic hot-melt binder systems to work with only one layer, which ensures strong fibre anchoring as well as tuft lock simultaneously with very strong adhesion between the secondary backing and the semi-manufactured material.

Two important criteria underlying the success of using the hot-melt binders are:
  that during extrusion on the semi-manufactured material they are sufficiently flowable to be able to penetrate into the primary backing forming part of the semi-manufactured material without soaking through pile to the top of the carpet.
  that sufficiently open-time is available—the hot-melt binder must stay liquid for sufficiently long so as to allow adhesion of the secondary backing thereto.

As previously mentioned, the above conditions can be met by means of various thermoplastic polymers or combinations of these.

By way of example it can be mentioned that according to the invention it has been a marked success to use flexible polypropylene family polymers, where high flexibility and mechanical strength are combined.

The materials in the secondary backing and the adhesive layer are essentially non-moisture absorbing, preferably moisture-proof polymers. This is advantageous as the carpet during use will not change dimensions when exposed to humidity and heat fluctuations. The stability of the carpet covering is thus ensured, while the weight thereof remains relatively low. The low weight of the backing construction (binder and adhesive layer) and the fact that the carpet can be rolled up easily moreover result in new and advantageous possibilities with regard to the manufacture thereof.

According to the invention the stiffness and the material of the backing and the binder layer may be chosen such that the thus formed carpet has a sufficient stability for application both as carpet tile and wall-to-wall carpet and a comparatively low weight and, after being formed, the carpet is wound onto so-called broadloom rollers and cut partially into carpet tiles.

A particularly strong adhesion between the semi-manufactured layer and the secondary backing layer is obtainable by establishing a stabilizing synergistic effect between the binder and the fibre structure of the secondary backing layer. Such synergistic effect may e.g. be provided by the fibre structure comprising fibres where the polymers have mutually different softening temperatures, and where the binder reaction temperatures at least lie between the softening temperature and the melting temperature of the first-molten fibre polymer in the fibre structure. Hereby the binder, when penetrating into the surface of the fibre structure, will react and bond together with the said first molten fibres. Hereby both the fibre structure and the binder contribute to adhesion. Simultaneously a strength imparting stabilization of the carpet covering is achieved.

In addition to the said positive properties provided by the adhesives (precoat and binder) and the secondary backings of the invention in terms of the mechanical dimensional stability of the carpet, they are also of great importance to the dimensional stability of the carpet in terms of climatic changes.

One of the main problems in relation to climatic dimensional stability is that the semi-manufactured material e.g. comprising polyamide or wool "pile materials" even though constructed on dimensionally stable primary backings will shrink and extend due to changes in temperature and humidity.

Previously this problem regarding dimensional stability is solved by use of the glass fibre reinforcement layers or heavy backing layers of bitumen or PVC mentioned in the "Background of the Invention".

By the carpet construction according to the invention is on the contrary achieved a saturation of the stabilizing part of the carpet with moisture proof polymers. The saturation with these polymers is in all embodiments of the new carpet sufficient to prevent degradation of stability due to moisture penetration.

The good dimensional stability under climatic changes is obtained since the secondary backing consists of essentially non-moisture absorbent materials and the main part of the adhesive layer consists of essentially non-moisture absorbent polymers after bonding thereof. The saturation is obtained by the adhesive layer which penetrates into the backside of the semi-manufactured material and the secondary backing as previously described. The saturation of the carpet construction can be sufficient to build up a waterproof membrane or can be just sufficient to allow a certain air permeability through the carpet.

For contract applications the carpet will in practice primarily be based on thermoplastic and non-moisture absorbing materials in the adhesive and the secondary backing layer.

It appears from the above description that the same types of thermoplastic polymers are applicable as fibres and adhesives to a great extent. The person skilled in the art will be able to select the proper ingredients without undue experimentation in order to obtain the proper melting characteristics depending on whether e.g. a fibre, a hot melt adhesive or a thermoplastic filler for the adhesive is desired. Typically the exact formulation is chosen by the supplier in accordance with the specified properties.

According to the invention special environmental advantages are obtainable at disposal of the floor covering. When the entire floor covering construction, i.e. pile, primary backing layer, binder and back are made from organic polymers, the floor covering used can be incinerated by a controlled incineration with energy recovery. As mentioned above, it may be a case of pure thermoplastic polymers and copolymers of e.g. polyesters, polyamides, polyacrylates etc., and combinations thereof. In many countries, like in Denmark, use is made of incineration with energy recovery when disposing of waste, such as used carpet coverings.

According to the invention possibility is also offered in a particularly advantageous way of melting down the used floor covering or treating it chemically so that afterwards it can be used in the production of new fibre floor coverings or other products. In this connection the entire floor covering construction comprising pile, primary backing layer, binder and secondary backing layer is to be produced from mutually re-cyclable compatible materials. Use can e.g. be made of 100% polyolefines (polyethylene/polypropylene), a 100% polyester based floor covering construction or a construction based on polyamides. It will be especially advantageous if the binder is constituted by 100% thermoplastic materials.

Before the present invention, the production of broadloom carpets and carpet tiles represented two different worlds. This is objectively proved by the fact that none of the cited prior art with relation to one of the product types has a cross-reference to the other.

In practice, this has manifested itself in that only very few carpet manufacturers with very specialized bitumen or PVC production lines have been capable of manufacturing competitive products which meet the specifications for contract carpet tiles.

On the contrary, the production of broadloom carpets is widely spread and the production generally involved lamination of a conventional secondary foam backing on a semi-manufactured material or a lamination of a woven or non-woven secondary backing on a semi-manufactured material back-sized with a filled latex precoat material.

The present invention is the first to bridge these two worlds, since now the broadloom manufacturers are able to produce a floor covering material on existing broadloom equipment and cut the material into high quality carpet tiles with minimal investments, namely only the necessary stamping/cutting equipment, if the manufacturer selects the embodiment based on an aqueous dispersion binder system containing a thermoplastic filler. The lamination can be made as a two step process firstly applying a precoat layer so as to improve the bonding of the pile to the primary backing and subsequently a binder layer to secure the secondary backing layer to the primary backing or as a one step process without separate application of precoat.

A further advantage is that the manufacturer does not have to decide from the outset, whether he wants to produce broadloom or tiles, since the finished product can be wound onto broadloom rollers and cut into tiles at a later stage according to the customer's needs. This flexibility in production, which was not available before the present invention was made, is extremely cost effective and enables the broadloom producers to gradually enter the attractive tile market without significant investment.

At the same time, the carpet producer obtains a very important "side effect", viz. a product which answers all current environmental questions and concerns:

A totally recyclable system with almost no residue.

Reduced environmental costs.

A product based on environmentally up-to date, non-toxic materials.

The manufacturer might prefer to use to the embodiment based on a latex and powder lamination technology, using a latex precoat and a thermoplastic powder adhesive as the secondary adhesive.

This embodiment has the advantage of reducing the water and energy consumption and consequently the production costs, i.a. due to the avoidance of the curing step necessary for removing the water from the dispersion binder and providing the desired bonding, while at the same time providing a more homogenous product quality, but requires further investment costs to modify the existing equipment.

Still more advantageous is the embodiment based on hotmelt lamination equipment. This technology, where a flexible thermoplastic polymer precoat and/or binder is extruded onto the backside of the semi-manufactured material has a number of advantages compared to the other embodiments:

Improved production stability and control of the product quality.

Lower energy consumption and production costs.

Much higher production speeds than conventional backing plants. More than 3–4 times the speed when manufacturing and backing carpets with light-weight secondary backings.

Reduced physical space, since no drying ovens are needed.

Possibility of exploiting advantages of large scale production and improved logistics.

The drawbacks as of today are that great investments in new machine technology are needed, and that the available know-how is rather limited. However, this embodiment undoubtedly has a great future, as the machine technology develops.

The present invention provides an environmentally up to date backing system for high performance carpets both as broadloom and tiles.

The invention provides a system which is easy to handle, install and remove and with great design/specification flexibility.

The invention opens new markets for broadloom producers, since it enables tile/broadloom production in the same process on existing equipment, if desired.

The invention provides an answer to environmental manufacturing concerns and reduces environmental costs.

The invention provides a better carpet eco-balance than heretofore possible, and enables incineration for energy recovery with high calorific value (greater than oil) with a low percentage of residue (ash).

BRIEF DESCRIPTION OF THE DRAWINGS

In the following the invention is explained in more detail, reference being made to the various embodiments and the drawings in which FIGS. 6–12 show Differential Scanning Calorimetry (DSC) curves for a representative selection of applicable polymer materials in the floor coverings according to the invention as further described below.

DETAILED DESCRIPTION OF THE INVENTION

Figure 1:
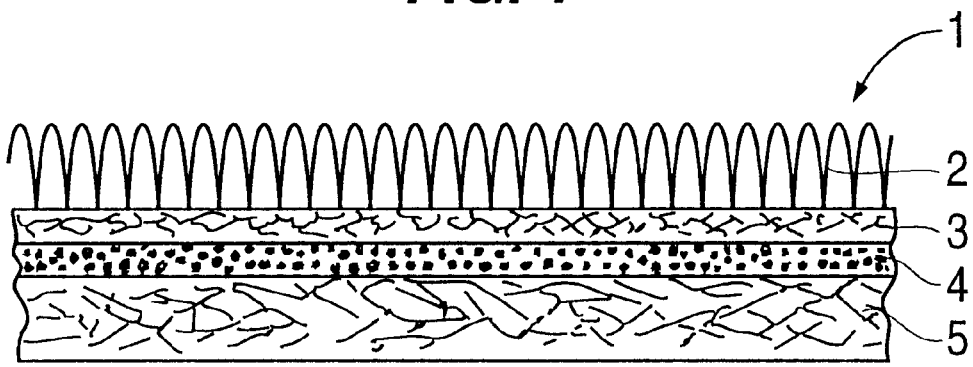
FIG. 1 shows a schematical section of the floor covering according to the invention where the primary backing layer comprises a woven material, FIG. 2 in the same way as in FIG. 1 shows another embodiment where the primary backing layer comprises a non-woven fibre structure.
Figure 2:
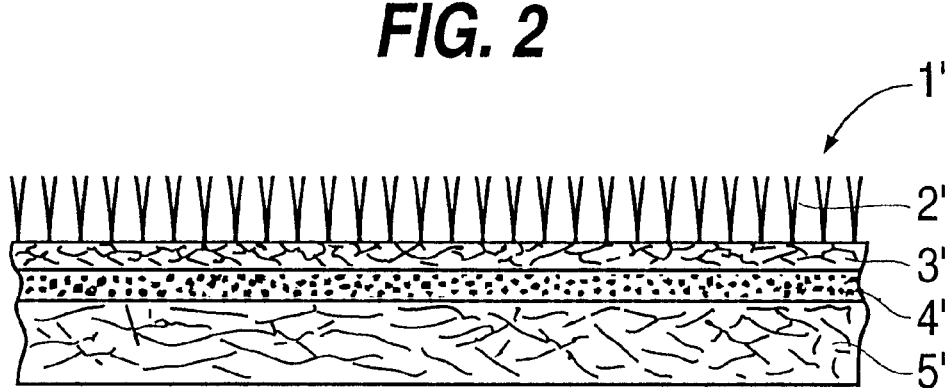
Figure 3:
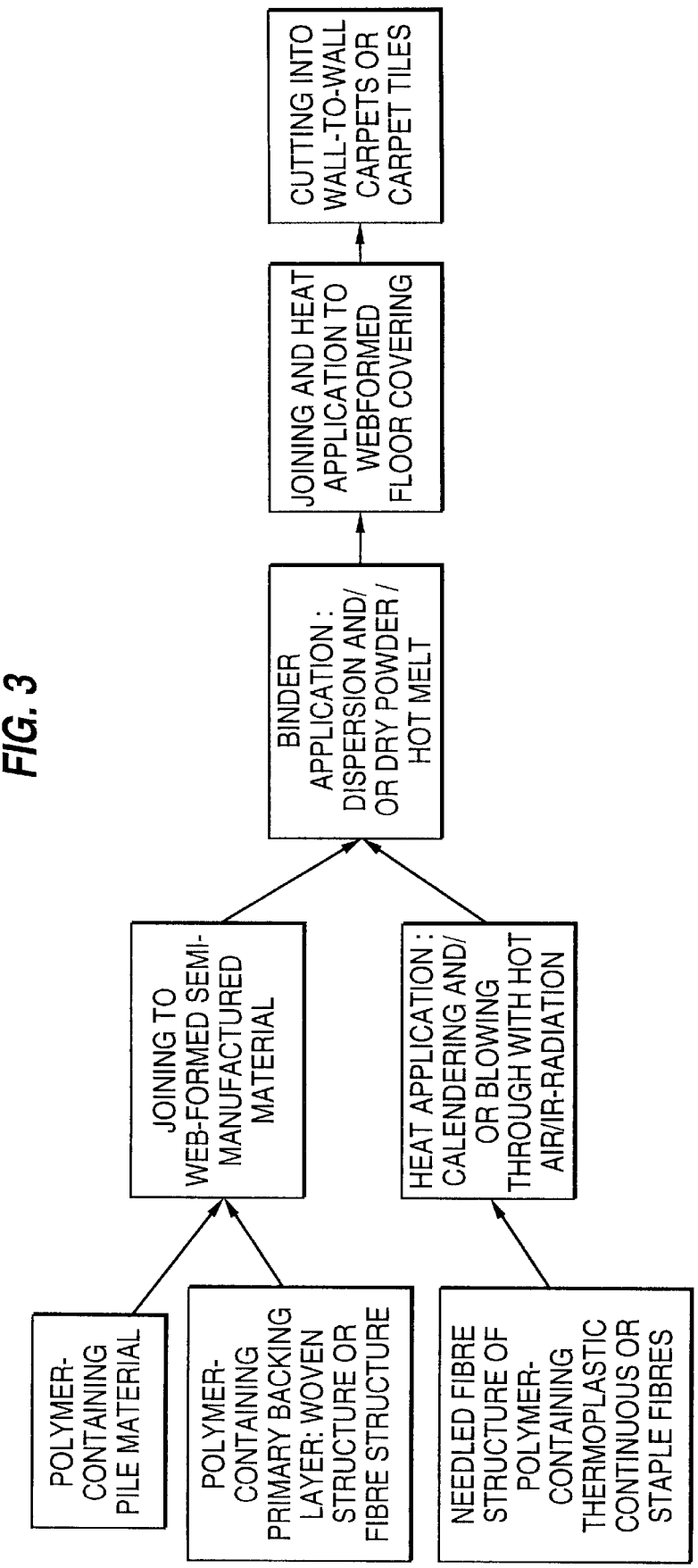
FIG. 3 shows the process steps according to the invention for producing the floor covering.

In case of the floor coverings 1 and 1' shown in FIGS. 1 and 2 a web-formed semi-manufactured material is produced in an initial production step, which material comprises polymer-containing pile material 2 and 2' being retained to a polymer-containing primary backing layer 3 and 3'. As mentioned in the introduction both the pile material and the primary backing layer may comprise both natural fibres and synthetic fibres, or mixtures thereof. In the embodiment shown in FIG. 1 the primary backing layer 3 is constituted by a woven primary backing layer, and the pile material is a loop pile 2. In the embodiment shown in FIG. 2 the primary backing layer 3' is constituted by a fibre structure e.g. a known spunbonded fibre structure, and the pile material is a cut pile 2'.

The web-formed semi-manufactured material 2, 3 or 2', 3' is joined with the underlying secondary backing layer 5, 5', respectively, by means of an interleafing adhesive layer 4, 4', respectively, and with simultaneous heat application to form the web-formed floor covering 1, 1', respectively, according to the invention. The web-formed floor covering is subsequently cut into wall-to-wall carpets or carpet tiles with the desired sizes.

The organic polymer-containing binder 4, 4', respectively, which is activated by a heat application, has a reaction temperature which is lower than the melting temperature for the majority of the fibre material content in the fibre structure. By the application of heat the binder is heated to a temperature in the interval 60–250° C., the heat application of course depending on the reaction temperature of the binder, which is adapted to the melting temperature for the majority of the fibre material type in the fibre structure, as will be explained in the following.

As previously mentioned the dispersion binders may be in the form of polymeric particles in aqueous solution, the dispersion binders can be divided into the groups chemically reactive binders and thermoplastic binders. The chemically reactive dispersion binders may be based on base polymers and copolymers of polystyrene butadiene, polyacrylate, polystyrene acrylate, polyvinylacetate and nitrile butadiene. As regards the thermoplastic dispersion binders they are thermoplastics dispersed in suspension to form a paste. The thermoplastics may be based on polymers and copolymers of polyolefines, polyester, polyamides etc. This type of binder is especially used when it is desired to be able to re-cycle the floor covering and the materials in the composite construction. E.g. polyolefine-containing binder is used when the carpet construction contains polypropylene and/or polyethylene fibres.

The adhesives may also be present in the form of 100% pure thermoplastics based on polymers and copolymers of polyolefines, polyesters and polyamides. The thermoplastics are applied onto the semi-manufactured material and the fibre structure of the secondary backing layer in dry state. Use may be made of several different application and lamination methods, e.g. powder application or melt application (hot melt).

By the powder application the thermoplastic binder is applied in powder form between the web-formed semi-manufactured material and the web-formed secondary backing layer, whereafter the layers are pressed together under heat impact, so that the thermoplastic is activated, melts and adheres the two layers to form the finished web-formed floor covering material.

By melt application the thermoplastic binder is heated to a liquid mass which is positioned e.g. by extrusion between the web-formed semi-manufactured material and secondary backing layer which subsequently are pressed together e.g. between rollers. Under subsequent cooling the liquid binder hardens, and the two layers are retained fixedly together to the finished web-formed floor covering material.

The binders consisting of 100% thermoplastic materials are used particularly advantageously when the floor covering is composed of mutually compatible and consequently recyclable materials.

Furthermore, it is important to indicate that the adhesive layer can comprise several layers—laid on one by one. For example can a layer of polyacryllatex comprising a polyethylene filler be laid as a precoat layer whereafter a hotmelt layer or a powder adhesive layer of polyethylene can be laid as a secondary adhesive layer. Another example could be applying a hotmelt layer as a precoat with a lower viscosity than the preceding binder layers (hotmelt or powder layers).

In the following the composition of the secondary backing layer 5, 5', respectively, is explained.

A typical construction of the backing layer is a fibre structure having a weight of about 300 g/m$^2$, with 80% polypropylene fibres having a length of 60–100 mm in approx. 5–15 dtex and 20% stretched out high density polyethylene fibres having a length of 60–100 mm in 72–20 dtex. By blowing through the fibre structure with hot air of approx. 110–140° C. the non-stretched HDPE-fibres are softened, and contract additionally 30%. The polypropylene fibres are not influenced during the blowing through with hot air. The HDPE-fibres contract around and adhere to the PP-fibres which hereby are fixed and locked in the fibre structure. Hereafter the back of the fibre structure may be calendered. Hereby a fibre structure is created which possesses both vertical strengths and dimensional stability as well as horizontal stability.

In another typical embodiment of the secondary backing layer the fibre structure has a weight of 600 g/m$^2$ and comprises 100% polypropylene fibres. Here a broad molecular weight distribution in polypropylene is utilized—the shorter molecule chains are first softened and utilized for adhering together and fixation of the fibres.

The fine strength and dimensional stability properties of the secondary backing layer are thus achieved by the said inter-fixation of the fibres in the structure. The calendering of the back contributes to a homogeneous surface without loose-hanging fibre material. Hereby the finished floor covering material can be fixedly adhered to underlying floor or foundation by existing adhesion methods, such as double-adhering tape, tackifiers or glue. It is a further advantage of the homogeneous surface that the back visually has been imparted with an even textile-like surface which may contribute in making the finished floor covering more exclusive in connection with sale and marketing.

Embossing and printing on secondary backing can also be means to improve the visual appearance of the floor covering.

The installation of broadloom carpets having a construction according to the invention gives a number of advantages. The fact that the broadloom carpet of the invention has a dimensional stability similar to that of carpet tiles and that it has a homogenous surface makes it possible to install it by using tackifier as opposed to the technique applied to-day where broadloom carpets are glued down to the sub-floor by means of a permanent glue. The reason why permanent glue is used to-day is that broadloom carpets which contain chalk etc., shrink and extend due to changes in temperatures and humidity. If a tackifier is used on such a carpet, unstability and subsequently wrinkles may occur. If a tackifier is used in connection with installation of broadloom carpets according to the invention, major cost savings are achieved due to reduced binder quantity and the fact that the binder is easily removed after use. Thus problems in connection with removal of permanent glue, levelling and repair of sub-floors are avoided.

It should be mentioned that for such uses of floor covering which call for low electrical surface and transition resistance, e.g. lower than 10$^9$ ohm the fibre structure may be admixed with easily conducting fibres, or be impregnated with an easily conducting liquid. By use of as much as 5% of either steel fibres or cobber and nickel coated fibres, or by the said impregnation of the fibre structure by approx. 0.8% of an easily conducting liquid, the backing may be imparted with electrical surface-transition resistance down to 10$^6$ ohm measured according to DIN 54345.

Figure 4:
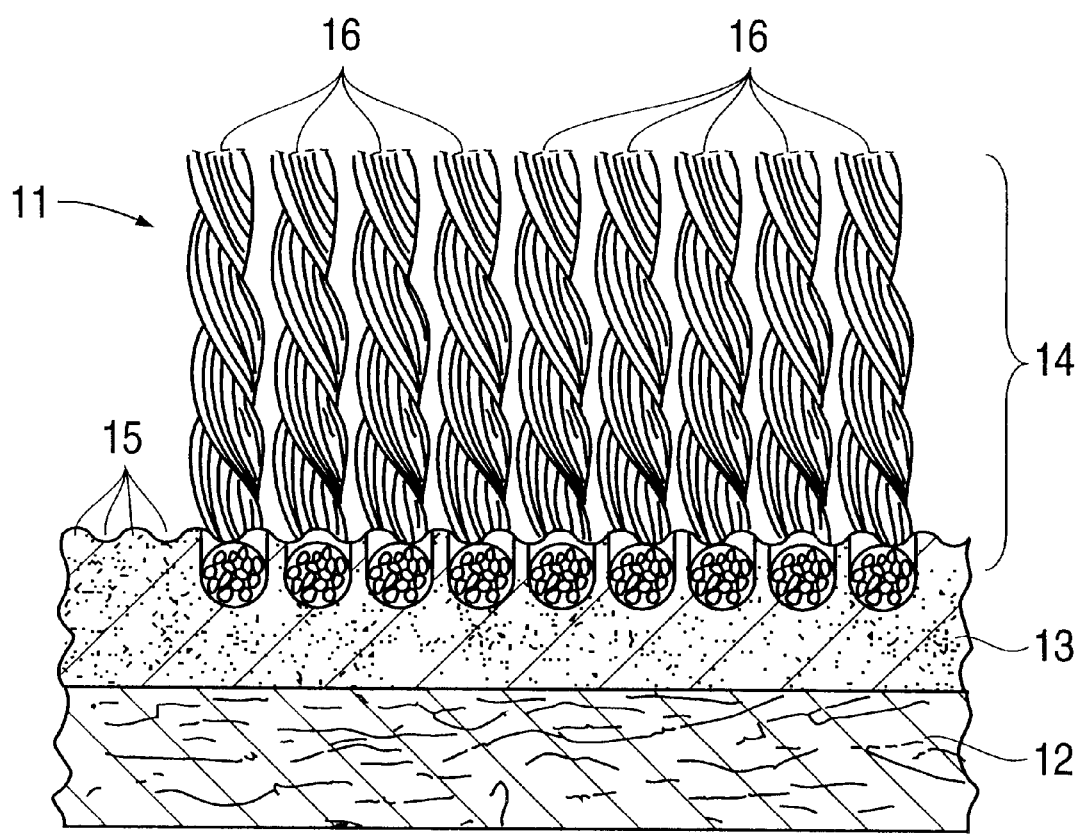
FIG. 4 shows a section through a part of a carpet tile according to the invention.

A carpet tile 11 (FIG. 4) comprises a secondary backing layer 12, a binder layer 13 and a top layer 14. The last-mentioned consists of a primary backing layer 15 and threads 16 stitched therein. Secondary backing layer 12 and binder layer 13 are relatively flexible and light and each comprise re-usable material, for example a re-usable polymer.

The re-usable polymer of the secondary backing layer 12 and/or binder layer 13 can be moisture-proof. The shape and dimension stability of tile 11 is hereby increased considerably, as the material of the secondary backing layer 12 and/or binder layer 13 can then absorb practically no moisture. Backing 12 can be manufactured for this purpose of for instance non-woven polypropylene, while as binder 13 can be used a mixture of latex and polyethylene. The exact mixing ratio of the binder components can be varied in order to obtain specific properties in specific carpet constructions. An exemplary mixture might e.g. contain 40% SBR latex asnd 60% polyethylene. To increase the stability of tile 11 a material is preferably used for the primary backing layer 15 which corresponds closely with secondary backing layer 12 in respect of its most important properties. A suitable choice in this case is a primary backing 15 of spun bonded polyester. The above materials not only result in a stable carpet tile 11 which is moreover to a very great extent reusable, whereby a significant reduction of the amount of waste for dumping or burning is already achieved, but they also result in a considerable reduction in the tile weight per se, whereby the amount of waste is reduced still further. Other combinations of materials and layer thicknesses are of course also conceivable with which a stable, easily processed and light tile 11 is obtained.

The specific weight of secondary backing layer 12 can for instance be in the order of 300 grams per square meter through use of the above described materials, while binder layer 13 can have a specific weight of for instance about 900 grams per square meter. Herewith the secondary backing 12 and binder layer 13 in this embodiment together represent between 35 and 70% of the total tile weight, since a typical top layer 14, which may have a thickness of several millimeters, will have a specific weight in the order of 500–2,000 grams per square meter (in the embodiment roughly 1,100 grams per square meter for the threads 16 and about 100 grams per square meter for the primary backing 15). The specific weight of the carpet tile 11 thus amounts in total to roughly 2.4 kilograms per square meter, therefore approximately half a conventional carpet tile. By selecting re-usable material for secondary backing 12 and/or binder layer 13, less than 200 grams per square meter of the original material remains for dumping after use and incineration.

Because the material of carpet tile 11 is relatively flexible and light it is simple to roll up. This makes it possible to wind the carpet onto broadloom rollers and supply it either as broadloom carpets or as carpet tiles, whereby for instance a relatively little used part of a floor of a room area can be fitted with broadloam carpet, while a more intensively used part of the area, for instance a passageway, can be laid with identical carpet tiles which after a period of time can be easily replaced. Considerable savings are thus achieved in carpeting costs while the quantity of waste material is also greatly limited in this way.

Figure 5:
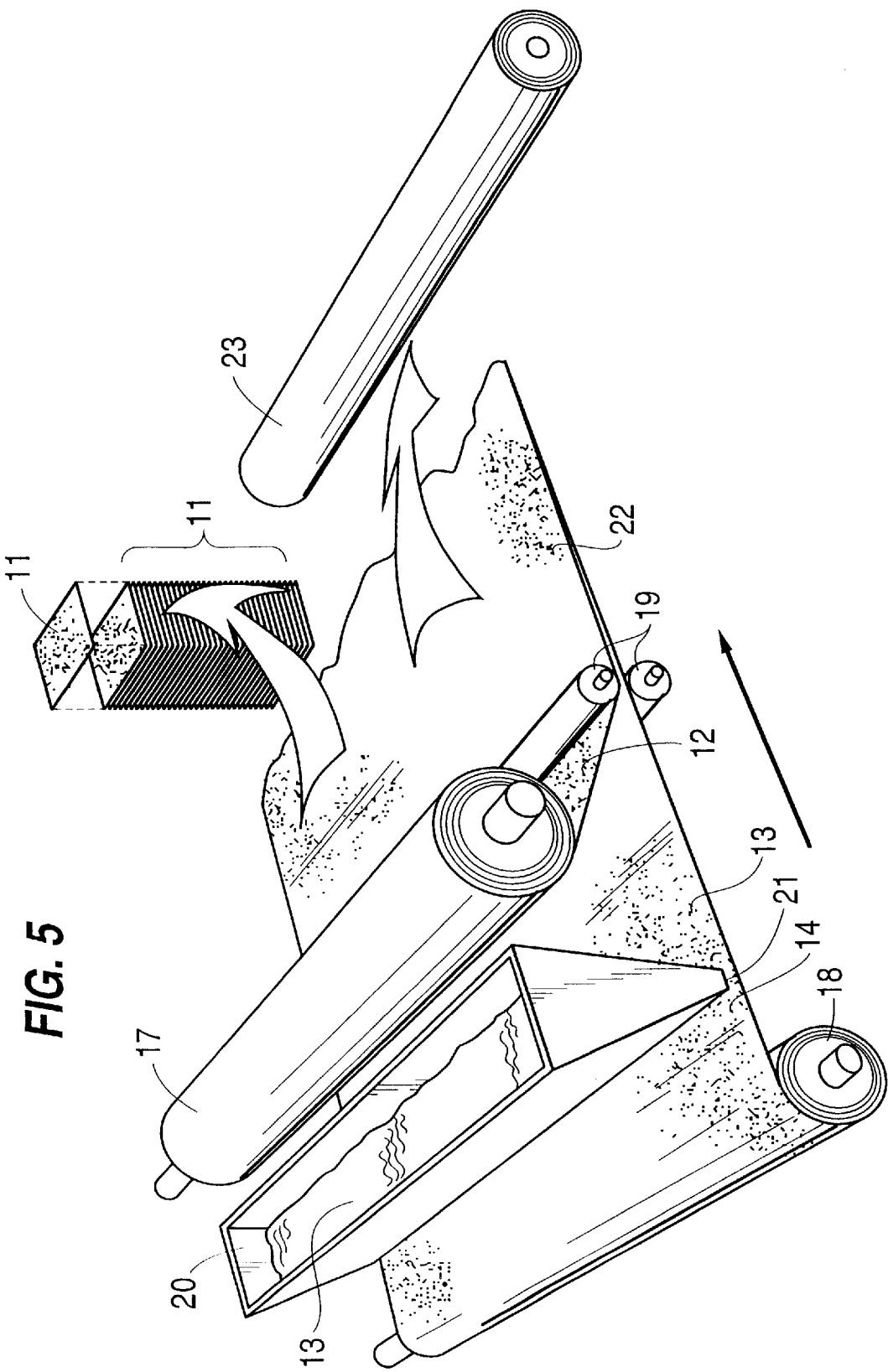
FIG. 5 shows schematically an example of a method of manufacture according to the invention.

A method of manufacture wherein carpet is produced in these two forms is depicted schematically in FIG. 5. Herein the separately formed secondary backing 12 and top layer 14 wound onto rollers 17 and 18 respectively are pressed onto one another between two pressure rollers 19 after a layer of binder 13 has first been applied to the top layer 14 from a reservoir 20 with an outlet opening 21. The carpet 22 obtained between the pressure rollers 19, optionally after heating or drying, is finally wound onto broadloom rollers 23 and at a later stage optionally partly cut into carpet tiles 11. A producer can thus supply in simple and inexpensive manner two well matched products, i.e. broadloom carpet and identical carpet tiles cut therefrom.

In the following examples are given of specific constructions of the fibre structure of the secondary backing layer:

1.1
  Weight: 300 g/m$^2$
  Material: 100% polypropylene (DSC curve FIG. 8)
  Fibre mixture: 5/11/15 dtex, 60/70/80/90 mm
  Heat treatment: Calendering on the back within the temperature interval 150–190° C.

Figure 9:
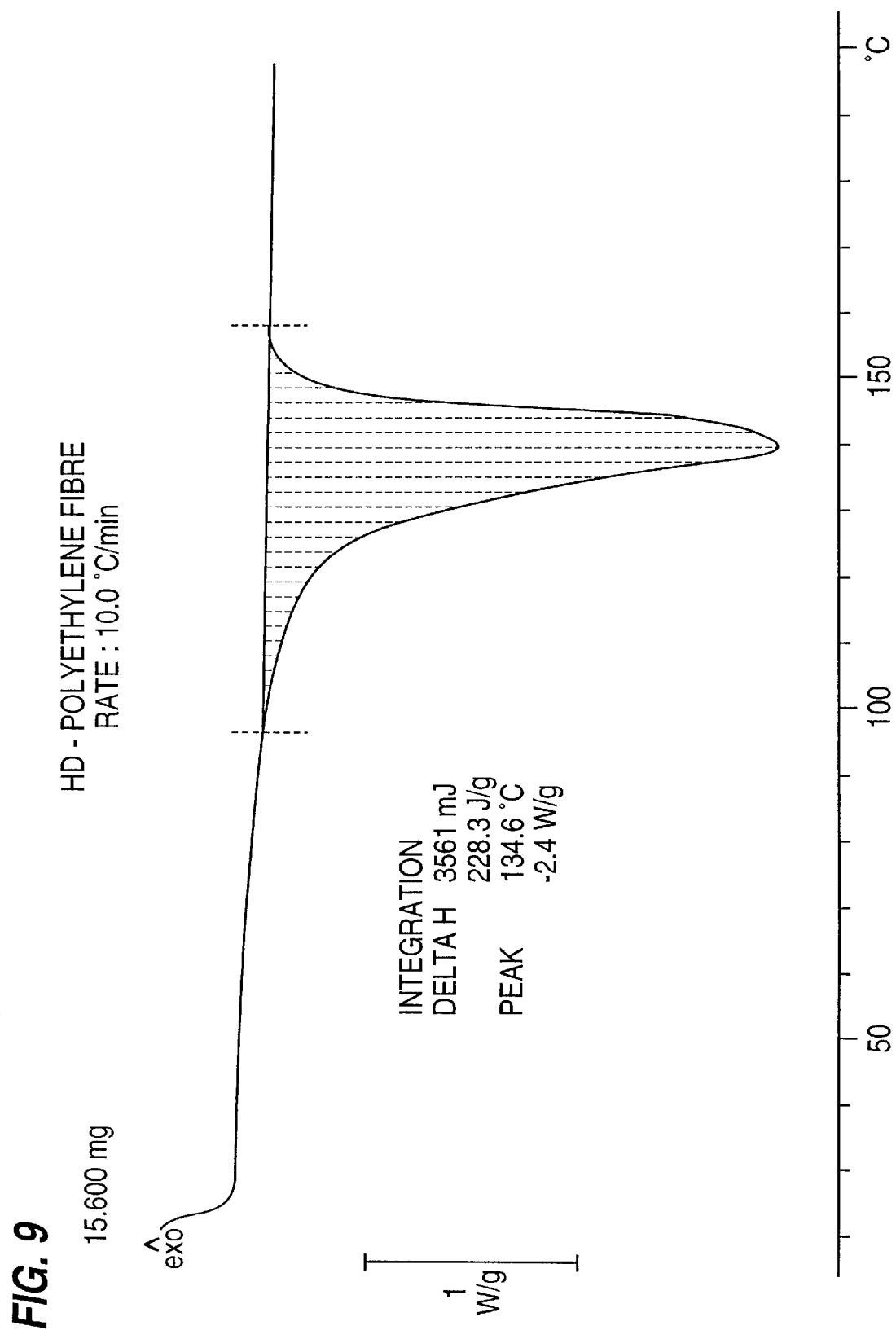

1.2
  Weight: 300 g/m$^2$
  Material: 70% polypropylene (DSC curve FIG. 8) and 30% polyethylene (DSC curve FIG. 9)
  Fibre mixture: Polypropylene 5/11/15 dtex, 60–100 mm
    Polyethylene 7–20 dtex, 60–100 mm.
  Heat treatment: A) Blowing through with hot air in the temperature interval 130–150° C.
    B) Calendering on the back at 140–180° C.

Figure 10:
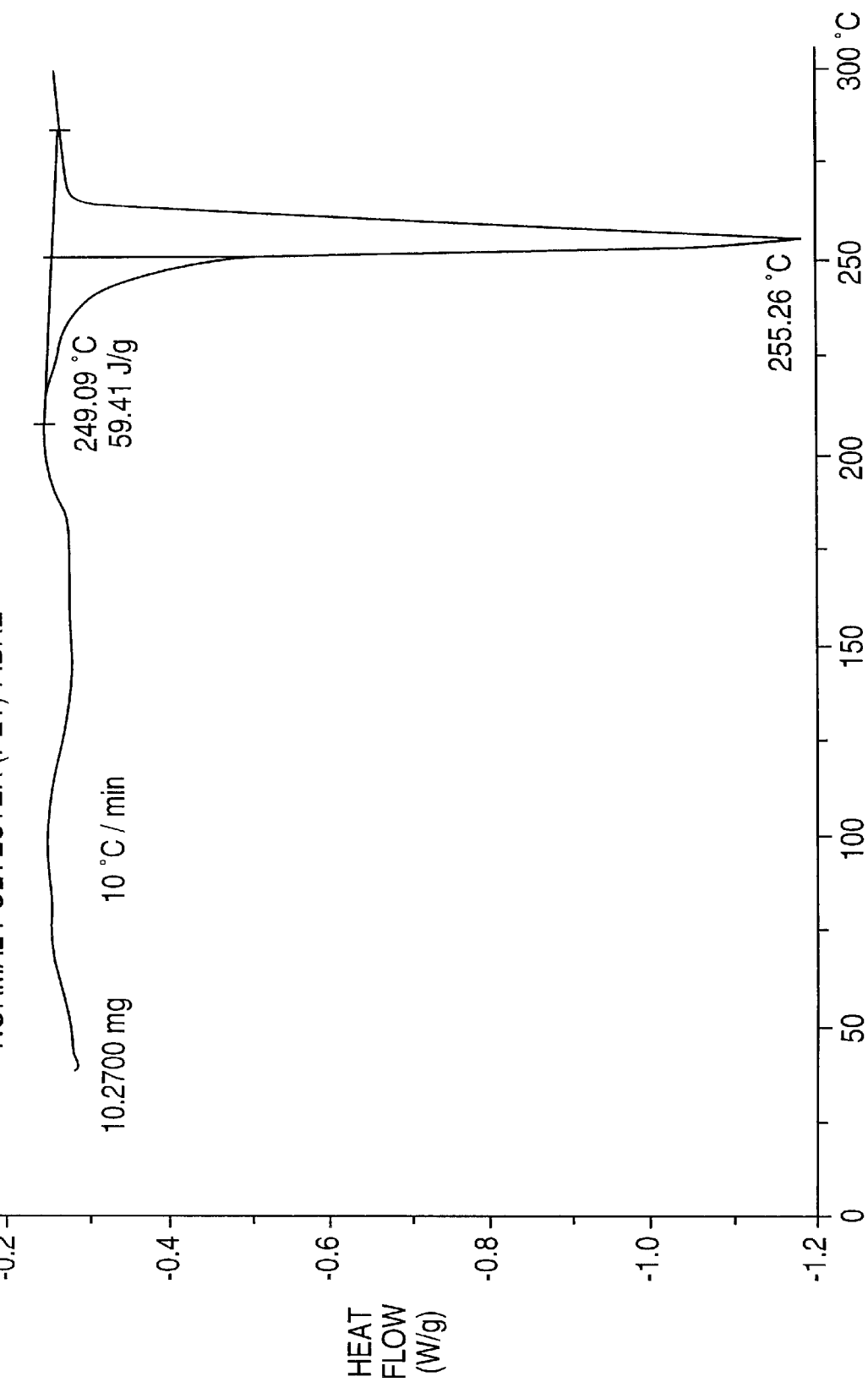
Figure 11:
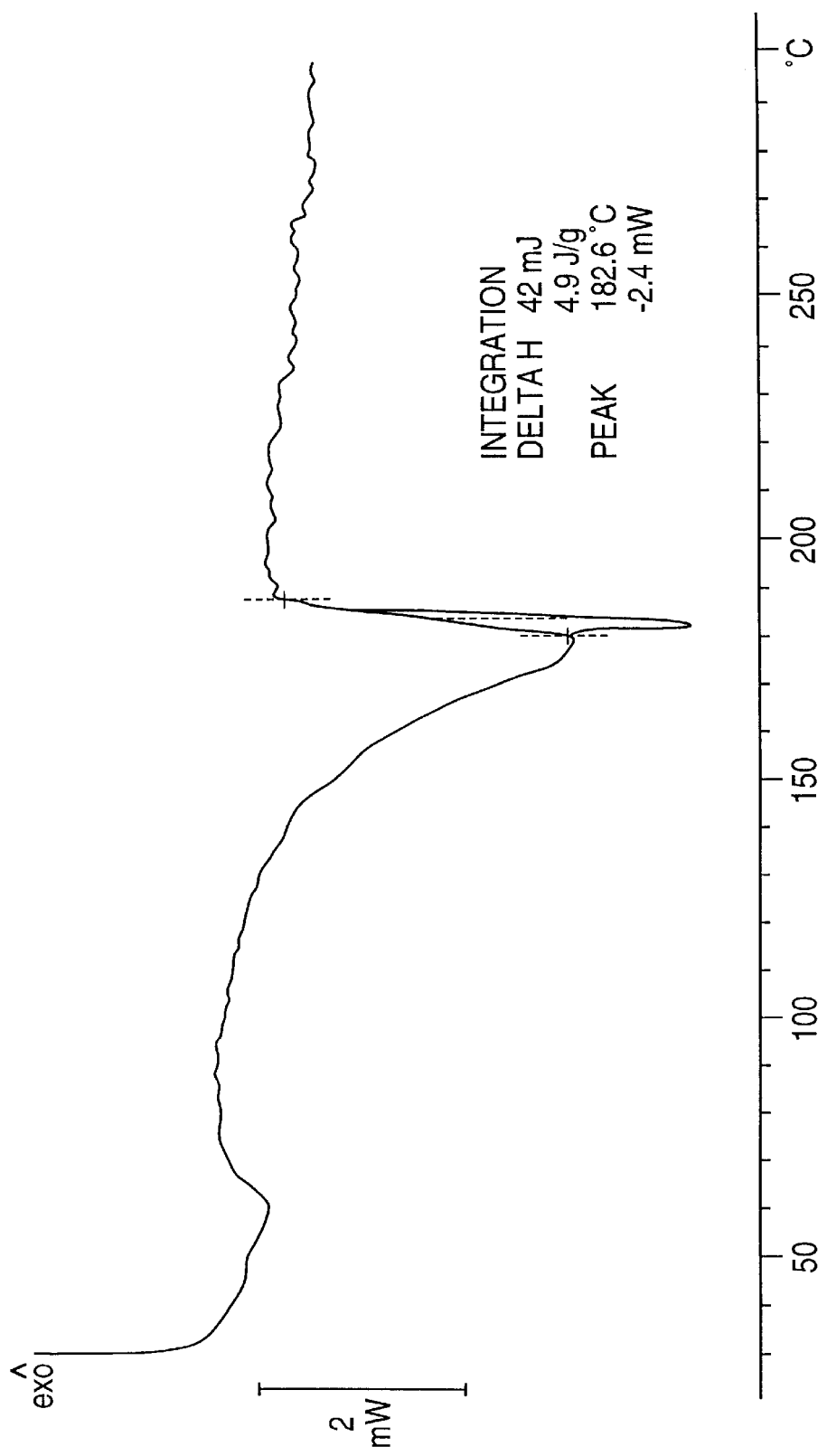

1.3
  Weight: 600 g/m$^2$
  Material: 70% polyester (PET, DSC curve FIG. 10) and 30% copolyester (DSC curve FIG. 11)
  Fibre mixture: Polyester 7/15 dtex, 60–80 mm Copolyester 6,7 dtex, 60–80 mm
  Heat treatment: A) Blowing through with hot air in the temperature interval 150–230° C.
    B) Calendering on the back at 200–260° C.

Figure 12:
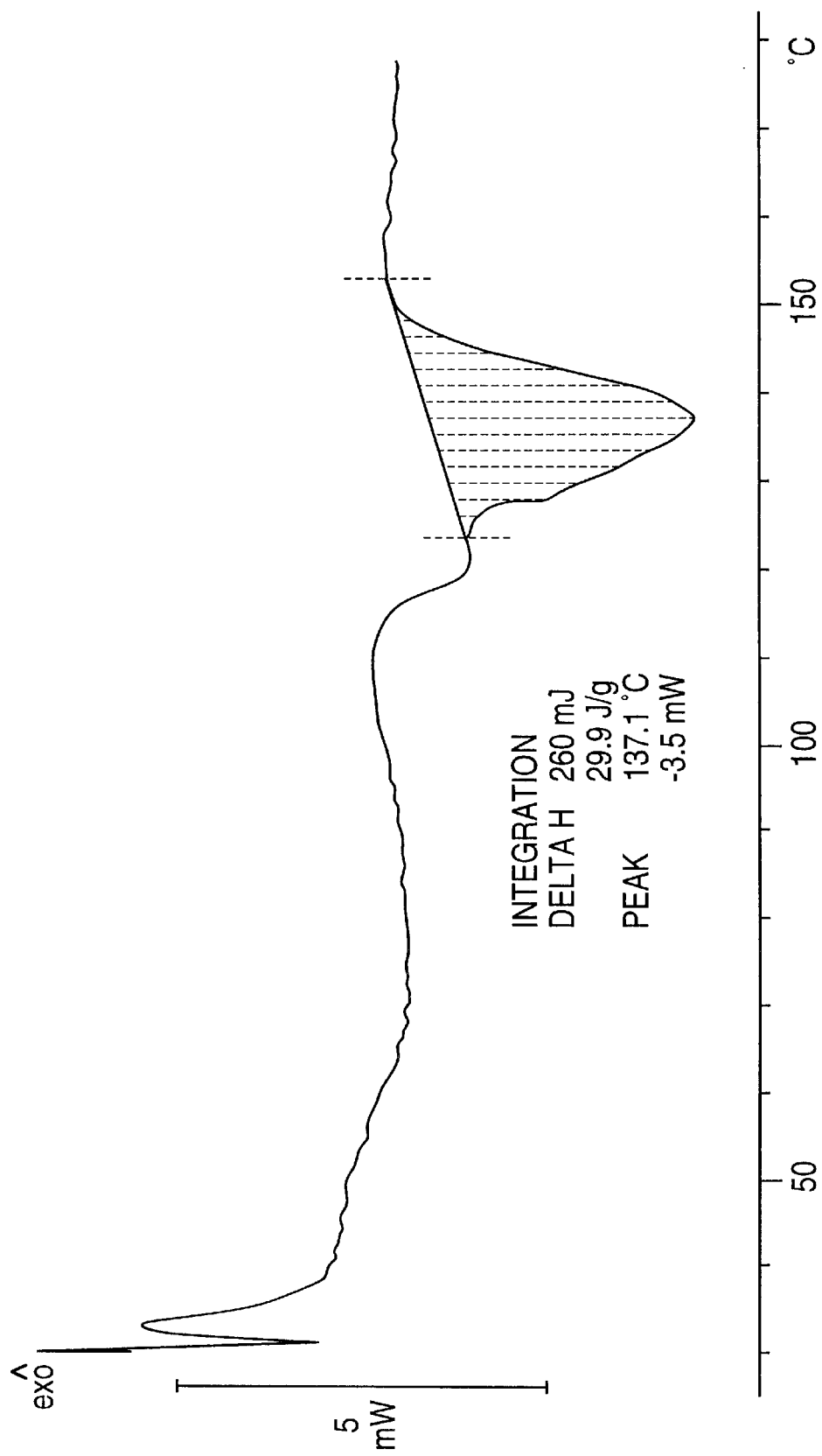

1.4
  Weight: 600 g/m$^2$
  Material: 70% polyamide 6 and 20% copolyamide (DSC curve FIG. 12)
  Fibre mixture: Polyamide 6 5/11/15 dtex, 60/80 mm
    Copolyamide 4,2/11 dtex, 50/80 mm
  Heat treatment: IR-radiation in the temperature interval 120–220° C.

In the following examples are given of expedient embodiments of the floor covering according to the invention:

2.1 (5/32 gauge loop pile)
  Pile material: 100% polypropylene, filament yarn, 650 g/m$^2$
Primary backing
  layer: 100% polypropylene, woven 120 g/m$^2$
  Adhesive layer: 100% polyethylene melt adhesive (supplied by Hüls AG, Germany, or Dow Chemical, USA) 400 g/m$^2$
Secondary backing
  layer: As in example 1.1, the weight may, however, be larger, e.g. 450 g/m$^2$.
  Total weight: 1620 g/m$^2$, see FIG. 1.
  Disposal level: Material recycling by melting.

2.2 (1/8 gauge cut pile)
  Pile material: 100% polyester spun yarn 800 g/m$^2$
Primary backing
  layer: 100% polyester spunbonded 120 g/m$^2$
  Adhesive layer: 100% copolyester melt adhesive (supplied by Ems Chemie, Domat-Ems, Switzerland, under the trade name Griltex 11) 400 g/m$^2$
Secondary backing
  layer: 100% polyester 500 g/m$^2$
  Total weight: 1820 g/m$^2$, see FIG. 2.
  Disposal level: Partial material recycling by melting and chemical treatment.

2.3 (1/10 gauge cut pile)
  Pile material: 100% polyamide-filament yarn 1100 g/m$^2$
Primary backing
  layer: 100% polyamide woven 140 g/m$^2$
  Adhesive layer: Paste adhesive based on copolyamide (supplied by Ems Chemie, Domat-Ems, Switzerland, under the trade name Griltex 8) 250 g/m$^2$
Secondary backing
  layer: 100% polyamide 600 g/m$^2$ or as in example 1.4
  Total weight: 2090 g/$^2$, see FIG. 1.
  Disposal level: Partial material recovery by melting down and chemical treatment.

2.4 (1/4 gauge loop pile)
  Pile material: 100% polyamide-filament yarn 1000 g/m$^2$
Primary backing
  layer: 100% polypropylene woven 120 g/m$^2$
  Adhesive layer: Modified pre-coat 800 g/m$^2$ and modified binder 480 g/m$^2$ based on carboxylated styrene acrylate copolymer with polyethylene filler (supplied by Dow Benelux, Tessenderlo, Belgium)
Secondary backing
  layer: As in example 1.1
  Total weight: 2700 g/m$^2$, see FIG. 1.
  Disposal level: Energy recovery by incineration.

2.5 (1/10 gauge cut pile)
  Pile material: 100% wool, 1100 g/m$^2$
Primary backing
  layer: 100% polypropylene woven 120 g/m$^2$
  Adhesive layer: Modified pre-coat 750 g/m$^2$ and modified binder 450 g/m$^2$ based on carboxylated styrene butadiene copolymer with polyethylene filler (supplied by Dow Benelux, Tessenderlo, Belgium)
Secondary backing
  layer: As in example 1.1
  Total weight: 2720 g/m$^2$, see FIG. 1.
  Disposal level: Energy recovery by incineration.

2.6 (1/8 gauge cut pile)
  Pile material: 100% polyamide, filament yarn 1100 g/m$^2$
Primary backing
  layer: 100% polyester, spun bonded 120 g/m$^2$
  Adhesive layer 1: Modified precoat based on carboxylated styrene acrylate copolymer (supplied by Dow Benelux) 450 g/m$^2$
  Adhesive layer 2: 100% polypropylene melt adhesive (supplied by Hüls/Dow) 200 g/m$^2$
Secondary backing: As in 1.1, the weight may, however, be larger, e.g. 600 g/m$^2$, 450 g/m$^2$
  Total weight: 2320 g/m$^2$.

2.7 (5/32 gauge loop pile)
  Pile material: 100% polypropylene, filament yarn 600 g/m$^2$ Primary backing: 100% polypropylene, woven 100 g/m²

Adhesive layer 1: Modified precoat based on carboxylated styrene acrylate copolymer, polyethylene as filler (supplied by Dow Benelux) 400 g/m²

Adhesive layer 2: 100% polyethylene melt adhesive (supplied by Hüls/Dow) 200 g/m²

Secondary backing: As in 1.1, the weight may, however, be larger, e.g. 450 g/m², 300 g/m Total weight: 1600 g/m².

2.8 (1/10 gauge cut pile)

Pile material: 100% polyamide, spun-yarn 800 g/m²

Primary backing: 100% polyester, spunbonded 120 g/m²

Adhesive layer 1: Modified precoat based on carboxylated styrene acrylate copolymer, polyethylene as filler and 300 parts aluminium-hydroxide (supplied by Dow Benelux) 600 g/m²

Adhesive layer 2: 100% polyethylene melt adhesive (supplier Hüls/Dow) 200 g/m²

Secondary backing: As in 1.1, the weight may, however, be lower, e.g. 450 g/m², 600 g/m².

Total weight: 2320 g/m².

2.9 (1/8 gauge cross over cut)

Pile material: 100% polyamide, filament yarn, 1000 g/m²

Primary backing: 100% polyester, spunbonded 120 g/m²

Adhesive layer 1: Modified precoat based on carboxylated styrene acrylate copolymer, polyethylene as filler and 200 parts aluminium-hydroxide (supplied by Dow Benelux) 600 g/m²

Adhesive layer 2: 100% polyethylene powder adhesive (supplied by Hüls/Dow), 200 g/m²

Secondary backing: As in 1.1 the weight may, however, be lower, e.g. 300 g/m², 450 g/m².

Total weight: 2370 g/m².

2.10 (1/8 gauge cut pile)

Pile material: 100% polyamide-filament yarn 1100 g/m²

Primary backing: 100% polyester spunbonded 120 g/m²

Adhesive layer: Modified precoat; 400 g/m² and modified binder 350 g/m² based on carboxylated styrene butadiene copolymer with polyethylene filler (supplied by Dow Benelux, Tessenderlo, Belgium)

Secondary backing: 100% Polypropylene 15 dtex, 450 g/m²—needlepunched and calendered at 150–190° C.

Total weight: 2420 g/m²

2.11 (1/10 gauge loop pile)

Pile material: 100% polyamide filament yarn 680 g/m²

Primary backing: 100% polyester spunbonded 120 g/m²

Adhesive layer: Modified precoat; 350 g/m² and modified binder 300 g/m² based on carboxylated styrene butadiene copolymer with polyethylene filler (supplied by Dow Benelux, Tessenderlo, Belgium).

Secondary backing: 100% polypropylene 5/11 dtex, 300 g/m²—needlepunched and calendered at 150–190° C.

Total weight: 1750 g/m²

2.12 1/8 gauge cut pile

Pile material: 100% polyamide—filament yarn 1100 g/m²

Primary backing: 100% polyester, spunbonded 120 g/m²

Adhesive layer: Polypropylene melt adhesive with flexible properties (supplied by Montell Polyolefins, Europe, under the trade name Adflex) 500 g/m²

Secondary backing: 100% polypropylene 5/11 dtex, 300 g/m²—needlepunched and calendered at 150–190° C.

Total weight: 2020 g/m²

2.13 1/10 gauge loop pile

Pile material: 100% polyamide—filament yarn 680 g/m²

Primary backing: 100% polyester, spunbonded 120 g/m²

Adhesive layer: Polypropylene melt adhesive with flexible properties (supplied by Montell Polyolefins, Europe, under the trade name Adflex) 400 g/m²

Secondary backing: 100% polypropylene 15 dtex, 450 g/m²—needlepunched and calendered at 150–190° C.

Total weight: 1650 g/m²

Figure 7:
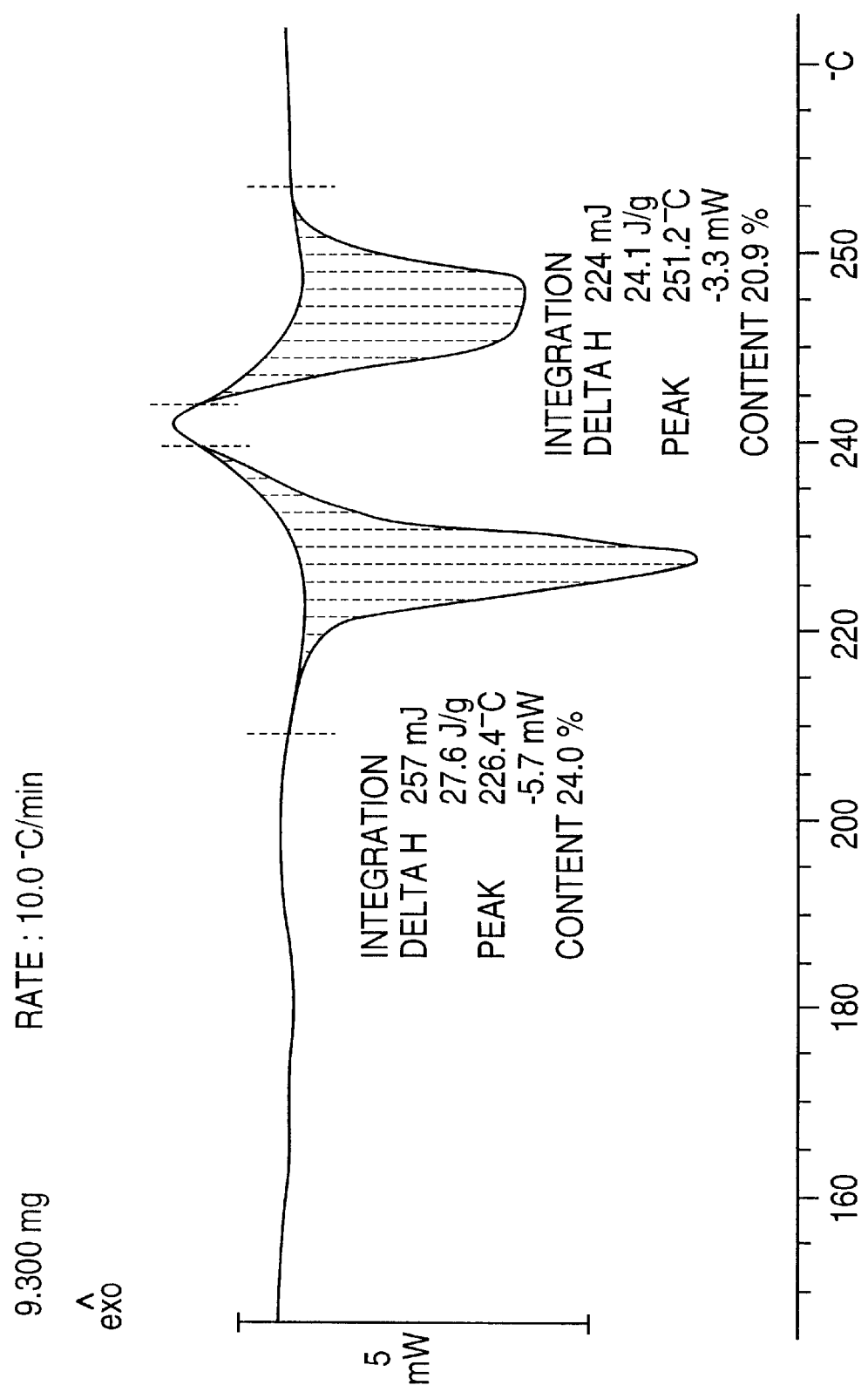

As previously mentioned the fibre structure can advantageously be made from a combination of two different fibre material types, where the core of the individual fibres is constituted by one fibre material type, and a surface is constituted by another fibre material type (bi-component fibres). E.g. fibres with polypropylene core and with a polyethylene surface may be used. DSC-curve for a typical fibre of this type is shown on FIG. 6. Use may also be made of polyester fibres with polyester core having a melting point of about 256° C. and with polyester having a melting point of about 225° C., DSC-curve for a typical fibre of this type is shown on FIG. 7, or with another polyester composition having a melting point e.g. of 140° C.

Testing of samples of floor covering embodiments according to the examples 2.1–2.9 has been carried out and compared with conventional bitumen tiles by the Danish Technological Institute according to ISO 34551/1-1981(E) with a view to determining residual ash percentage at total incineration at 600° C. A representative example of the results are shown in Table A.

TABLE A

| Ash, percentage by mass of the Conventional bitumen carpet tile | | |
| --- | --- | --- |
| Test no. | Total sample, incl. pile and under part | Under part of the sample *) |
| 1 | 45.9 | 65.2 |
| 2 | 44.3 | 65.8 |
| Mean values | 45.1 | 65.6 |
| Mass of test specimen | approx. 4.5 g | approx. 3.0 g |

| Ash, percentage by mass of the New Development | | |
| --- | --- | --- |
| Test no. | Total sample, incl. pile and under part | Under part of the sample *) |
| 1 | 0.9 | 1.0 |
| 2 | 0.9 | 1.0 |
| Mean values | 0.9 | 1.0 |
| Mass of test specimen | approx. 1.8 g | approx. 0.4 |

*) The pile was separated from the under part of the adhesive layer.

Many changes can be made without departing from the idea of the invention. Thus, many different material combination may be used in the composite layers of the floor covering as long as the secondary backing layer comprises a needled fibre structure of thermoplastic polymer-containing fibres being inter-fixated by heating, and as long as the adhesive layer comprises a polymer-containing binder which is activated by heat application.

We claim:

1. A low-stretch floor covering material applicable both as broadloom carpets and as carpet tiles, said material exhibiting both dimensional stability under climatic change and the ability to be wound onto broadloom rollers, said covering material comprising:

a primary backing layer having a first surface and a second surface opposite said first surface, a pile material extending outwardly from said first surface and retained to said primary backing layer so as to form a top layer, and an underlying secondary backing layer having s specific weight of 70–1000 g/m² and comprising a needled non-woven fibre structure of continuous or staple fibres formed of thermoplastic polymers selected from the group consisting of polyolefins, polyesters and combinations thereof, wherein the individual fibres are connected and inter-fixated by heating the fibre structure to a temperature corresponding to the softening temperature of the thermoplastic fibres so as to form a low stretch, three dimensionally stable fibre structure, and an intermediate adhesive layer for bonding said secondary backing layer to the second surface of said primary backing layer and comprising an organic, polymer-containing binder which has been activated by heat application at an activation temperature which is lower than the melting temperature of a majority of the thermoplastic fibres forming the fibre structure, said binder being essentially non-moisture absorbing after it has been activated to bond the secondary backing to the primary backing.

2. A floor covering material according to claim 1, wherein the secondary backing layer has a specific weight of 100–600 g/m².

3. A floor covering material according to claim 2 wherein the secondary backing layer has a specific weight of 300–600 g/m².

4. A floor covering material according to claim 1, wherein the thermoplastic fibres are formed of polymers and copolymers selected from the group consisting of polyolefins, polyesters, polyamides, polyacrylates, and combinations thereof.

5. A floor covering material according to claim 1, wherein the fibre structure comprise at least two different fibre materials having a softening temperature difference of at least 10° C. between the fibre material with the lowest softening temperature and the fibre material with the second lowest softening temperature.

6. A floor covering material according to claim 1, wherein the fibre structure comprises bi-component fibres having cores constituted by one fibre material, and surfaces constituted by another fibre material type.

7. A floor covering material according to claim 1, wherein the binder used in forming the adhesive layer is an aqueous dispersion binder containing polymeric particles.

8. A floor covering material according to claim 7, wherein the binder is chemically reactive and comprises polymers of polystyrene butadiene, polyacrylate, polystryrene acrylate, polyvinylacetate nitrile butadiene or copolymers thereof.

9. A floor covering material according to claim 8, wherein the chemically reactive binder further comprises a thermoplastic filler.

10. A floor covering material according to claim 7, wherein the binder used in forming the adhesive layer comprises one or more thermoplastics dispersed in a suspension so as to form a paste.

11. A floor covering material according to claim 1, wherein the binder used in forming the adhesive layer is a thermoplastic powder adhesive, or a thermoplastic hat melt adhesive.

12. A floor covering material according to one of the claim 9–11, wherein the thermoplastics comprise polyolefines, polyesters or copolymers thereof.

13. A floor covering material according to claim 1, wherein the intermediate adhesive layer comprises both a first adhesive for improving the retention of the pile material to the primary backing layer and a second adhesive binder for securing the secondary backing layer to the primary backing layer.

14. A floor covering material according to claim 13, wherein the first adhesive precoat layer comprises an aqueous dispersion binder containing a thermoplastic filler.

15. A floor covering material according to claim 13, wherein the second adhesive binder layer comprises a polyacrylic latex, and SBR-latex or styrene acrylate latex, each containing a polyolefin filler.

16. A floor covering material according to claim 13, wherein the second adhesive binder layer is a melt adhesive.

17. A floor covering material according to claim 13, wherein the second adhesive binder layer is a thermoplastic powder adhesive.

18. A floor covering material according to claim 13, wherein the second adhesive binder layer is formed from an aqueous dispersion binder.

19. A floor covering material according to claim 1, wherein at least one of the secondary backing layer and the adhesive layer comprise a substantially re-usable material.

20. A floor covering material according to claim 19, wherein the re-usable material is a polymer.

21. A floor covering material according to claim 19, wherein the re-usable material is moisture-proof.

22. A floor covering material according to claim 19, wherein the secondary backing layer comprises polypropylene and the adhesive layer comprises polyethylene.

23. A floor covering material according to claim 19, wherein the top layer consists of a primary backing layer and threads stitched therein and the primary backing layer and the secondary backing layer are each in the form of a non-woven sheet.

24. A floor covering material according to claim 23, wherein the primary backing layer comprises a polyester.

25. A method of producing a floor covering material (1) according to claim 1, comprising the steps of initially producing a web-formed semi-manufactured material comprising a pile material (2) retained to a primary backing layer (3), heating a web-formed secondary backing layer (5) having a specific weight of 70–1000 g/m² and comprising a needled fibre structure of essentially non-moisture absorbing thermoplastic, polymer-containing, continuous or staple fibres to a temperature at least corresponding to the lowest softening temperature for the fibre materials in the fibre structure so as to provide an interfixation of the fibres, joining the back side of the web-formed semi-manufactured material (2,3) with the web-formed backing layer (5) by interleafing an adhesive layer (4) comprising an organic polymer-containing binder having a reaction temperature which is lower than the melting temperature for the majority of the fibre material content in the fibre structure and activating the binder by heat application, cooling the formed floor covering material (1) so as to provide an essentially non-moisture absorbing bonded adhesive layer (4), winding the material (1) onto broadloom rollers and optionally cutting the material wholly or partially into carpet tiles.

26. A method according to claim 25, wherein the adhesive layer is interleafed in an amount so that the specific weight of the secondary backing and the adhesive does not exceed 1800 g/m².

27. A method according to claim 25, wherein the web-formed secondary backing layer (5) is heated by a calandering to a temperature essentially within the interval from 110° C. to 260° C.

28. A method according to claim 25, wherein the web-formed secondary backing layer (5) is heated by blowing through hot air to a temperature essentially within the interval from 110° C. to 260° C.

29. A method according to claim 25, wherein the web-formed secondary backing layer (5) is heated by infra-red radiation to a temperature essentially within the interval from 100° C. to 260° C.

30. A method according to claim 25, wherein the interleafing adhesive layer comprises a pre-application of the binder on the back side of the web-formed semi-manufactured top layer (2,3) or on the upper side of the secondary backing layer (5), prior to joining thereof.

31. A method according to claim 25, wherein the interleafing adhesive layer (4) comprises a first adhesive layer (precoat layer) and a second adhesive layer (binder layer), said first precoat layer being first applied to the back side of the top layer (2,3) whereafter the second binder layer is applied to the secondary backing layer prior to joining thereof.

32. A method according to claim 25 further comprising cutting the finished produced web-formed floor covering material (1) at least crosswise of the direction of advance to form floor covering pieces in the desired size, e.g. for use as carpet tiles.

33. A method according to claim 25 for manufacturing a floor covering material (1) by forming a top layer (2,3) comprising a primary backing layer (3), forming a secondary backing layer (5) and bringing them together and, by interleafing a binder (4), mutually joining the top layer (2,3) and the secondary backing layer (5), wherein the stiffness and the material of the secondary backing layer (5) and the binder layer (4) are chosen such that the thus formed floor covering material has a sufficient dimension stability under climatic changes for application as carpet tile and a comparatively low weight and, after being formed, the floor covering material is wound onto so-called broadloom rollers and cut partially into carpet tiles.

34. A floor structure comprising a sub-floor having attached thereto with a tackifier a floor covering material according to claim 1.

35. A floor covering material according to claim 14 wherein the fibres are formed of a polyolefin selected from the group consisting of polypropylene and polyethylene.

36. A floor covering material of claim 16 wherein the melt adhesive is selected from polypropylene, polyethylene or copolyester melt adhesive.

37. A floor covering material of claim 17 wherein the thermoplastic powder adhesive is a polyethylene powder adhesive.

38. A floor covering material of claim 18 wherein the aqueous dispersion binder is a carboxylated styrene butadiene copolymer latex containing a polyethylene filler.

* * * * *

UNITED STATES PATENT AND TRADEMARK OFFICE
CERTIFICATE OF CORRECTION

PATENT NO. : 5,902,663
DATED : May 11, 1999
INVENTOR(S) : Justesen et al.

It is certified that error appears in the above-identified patent and that said Letters Patent is hereby corrected as shown below:

<u>Column 19, claim 1,</u>
Line 4, "s specific" should read -- a specific --.

<u>Column 19, claim 8,</u>
Line 50, "polystryrene" should read -- polystyrene --.

<u>Column 19, claim 11,</u>
Line 61, "hat" should read -- hot --.

<u>Column 20, claim 13,</u>
Line 1, after "adhesive" insert -- precoat layer --.

<u>Column 20, claim 15,</u>
Line 10, "and SBR-latex" should read -- an SBR-latex --.

<u>Column 20, claim 25,</u>
Lines 37-63, delete in their entirety and substitute therefor:

-- 25. A method of producing a floor covering material according to claim 1, comprising the steps of
    initially producing a web-formed material having the pile material retained to the primary backing layer,
    heating a web-formed secondary backing layer having a specific weight of 70-1000 $g/m^2$ and having a needled non-woven fibre structure of continuous or stable fibres formed of thermoplastic polymers selected from the group consisting of polyolefins, polyesters and combinations thereof to a temperature corresponding to the softening temperature of the thermoplastic fibres to cause the individual fibres to become connected and inter-fixated,
    bonding the back side of the web-formed material to the web-formed backing layer by interleafing an adhesive layer containing an organic polymer-containing binder having a reaction temperature which is lower than the melting temperature of the majority of the thermoplastic fibres structure and activating the binder by heat application,
    cooling the formed floor covering material so as to provide an essentially non-moisture absorbing bonded adhesive layer, and
    winding the cooled material onto broadloom rollers, thereby producing a finished web-Formed floor covering. --

UNITED STATES PATENT AND TRADEMARK OFFICE
CERTIFICATE OF CORRECTION

PATENT NO.    : 5,902,663
DATED         : May 11, 1999
INVENTOR(S)   : Justesen et al.

It is certified that error appears in the above-identified patent and that said Letters Patent is hereby corrected as shown below:

Column 21, claim 27,
Line 2, delete "(5)".

Column 21, claim 29,
Line 10, delete "(5)".

Column 21, claim 30,
Line 16, delete "(2,3)"; and
Line 27, delete "(5)".

Column 21, claim 31,
Line 19, delete "(4)"; and
Line 27, delete "(2,3)".

Column 21, claim 32,
Line 27, delete "(1)";
Line 28, "in" should read -- of --; and
Line 28-29, after "size", delete ", e.g., for use as a carpet titles".

Column 22, claim 33,
Lines 1-12, delete in their entirety and substitute therefor:

-- 33. A method according to claim 26, wherein the stiffness and the material of the secondary backing layer and the binder layer are such that the thus formed floor covering material has a sufficient dimension stability under climatic changes for application as carpet tiles and a comparatively low weight and, after being formed, the floor covering material is wound onto broadloom rollers and cut partially into carpet tiles. --

UNITED STATES PATENT AND TRADEMARK OFFICE
CERTIFICATE OF CORRECTION

PATENT NO. : 5,902,663
DATED : May 11, 1999
INVENTOR(S) : Justesen et al.

It is certified that error appears in the above-identified patent and that said Letters Patent is hereby corrected as shown below:

Column 22, claim 35,
Line 16, "claim 14" should read -- claim 4 --.

Signed and Sealed this

Twenty-fifth Day of December, 2001

Attest:

*Attesting Officer*

JAMES E. ROGAN
*Director of the United States Patent and Trademark Office*